(12) United States Patent
Paver et al.

(10) Patent No.: US 8,725,953 B2
(45) Date of Patent: May 13, 2014

(54) LOCAL CACHE POWER CONTROL WITHIN A MULTIPROCESSOR SYSTEM

(75) Inventors: Nigel C Paver, Austin, TX (US); Stuart D Biles, Green Gincer (GB); Kevin P Welton, Austin, TX (US); Paul G Meyer, Bee Cave, TX (US)

(73) Assignee: ARM Limited, Cambridge (GB)

( * ) Notice: Subject to any disclaimer, the term of this patent is extended or adjusted under 35 U.S.C. 154(b) by 956 days.

(21) Appl. No.: 12/320,211

(22) Filed: Jan. 21, 2009

(65) Prior Publication Data

US 2010/0185821 A1 Jul. 22, 2010

(51) Int. Cl.
*G06F 12/08* (2006.01)

(52) U.S. Cl.
CPC ........ *G06F 12/0888* (2013.01); *G06F 12/0891* (2013.01)
USPC .......................................... 711/141; 711/146

(58) Field of Classification Search
CPC ............ G06F 12/0831; G06F 12/0891; G06F 12/0888; G06F 2/3228; G06F 22/004
USPC ............ 713/324, 32, 323, 320; 711/146, 141, 711/E12.026, E12.033
See application file for complete search history.

(56) References Cited

U.S. PATENT DOCUMENTS

| | | | | |
|---|---|---|---|---|
| 5,530,932 A | * | 6/1996 | Carmean et al. | 713/324 |
| 5,931,951 A | * | 8/1999 | Ando | 713/324 |
| 5,954,820 A | * | 9/1999 | Hetzler | 713/323 |
| 6,631,474 B1 | * | 10/2003 | Cai et al. | 713/300 |
| 7,752,474 B2 | * | 7/2010 | Keller et al. | 713/324 |
| 2009/0024799 A1 | * | 1/2009 | Jahagirdar et al. | 711/130 |
| 2009/0201082 A1 | * | 8/2009 | Smith et al. | 327/544 |

\* cited by examiner

*Primary Examiner* — Pierre-Michel Bataille
(74) *Attorney, Agent, or Firm* — Nixon & Vanderhye P.C.

(57) ABSTRACT

A data processing system including a plurality of processors 4, 6, 8 each having a local cache memory 10, 12, 14 is provided. A cache coherency controller 16 serves to maintain cache coherency between the local cache memories 10, 12, 14. When one of the processors 4, 6, 8 is placed into a low power state its associated local cache memory 10, 12, 14 is maintained in a state in which the data it is holding is accessible to the cache coherency controller 16 until a predetermined condition has been met whereupon the local cache memory 10, 12, 14 concerned is placed into a low power state. The predetermined condition can take a variety of different forms such as the rate of snoop hits falling below a threshold value, the ratio of snooping hits to snoop requests falling below a threshold value, a predetermined number of clock cycles passing since the associated processor for that local cache memory was powered down as well as other possibilities.

21 Claims, 6 Drawing Sheets

LOCAL CACHE POWER CONTROL WITHIN A MULTIPROCESSOR SYSTEM

BACKGROUND OF THE INVENTION

1. Field of the Invention

This invention relates to the field of data processing systems. More particularly, this invention relates to the power control of local cache memories within multiprocessor systems.

2. Description of the Prior Art

It is known to provide multiprocessor systems in which a plurality of processors are provided and between which processing tasks are scheduled for execution. Respective processors typically have their own local cache memory for improving performance and reducing power consumption. In order to maintain coherency between the data held within the different local cache memories it is known to provide cache coherency controllers which snoop memory access requests and, if necessary, provide data from another local cache, or update data in another local cache, in order that locally cached copies represent the correct up-to-date value for a given item of data. For example, one processor may be updating a counter which is held in its local cache memory. Another processor may then wish to read that counter value and issues a memory request to its own local cache for that value. The cache coherency controller will detect the cache request and snoop into the other local caches to determine if any of the other local caches is holding a more up-to-date version of that counter value. In this circumstance, the more up-to-date counter value will be identified within the local cache of the other processor and that value supplied to satisfy the cache request. Such snooping and cache coherency mechanisms will be familiar to those in this technical field.

Another known feature of multiprocessor systems is the ability to power down one or more of the processors when they are not required. As an example, if the processing load decreases then it may be adequately serviced by a single processor remaining active and the remaining processors can be powered down with no detrimental impact upon the operation of the system. Powering down unneeded processors significantly reduces power consumption. Such powering down of processors may be performed under control of the operating system. It enhances the ability to perform desirable powering down of processors if the system does not need to wait until a processor to be powered down has completed all of its processing tasks. Thus, a processor may still be performing a processing task and the operating system may this task migrate to another processor so that the original processor can be powered down. Migrating processing tasks to facilitate powering down of processors improves the power savings that can be achieved. It may be that some of the processing tasks would continue almost indefinitely if it were not possible to migrate them, e.g. a network control task may have no natural end point and would continue indefinitely to keep its processor active to some extent unless it was migrated to another processor.

A problem when a processing task is migrated is that the data values it has been using and manipulating will be held in the local cache memory of the processor to be powered down. The data within the local cache memory may be dirty data corresponding to more up-to-date values of particular data items than are held in the main memory. The data also corresponds to data items which has been fetched from the main memory for use by the processing task concerned. Refetching data from the main memory which has already been fetched into a local cache memory unnecessarily consumes additional power. Flushing dirty data back to the main memory when it is present within the local cache memory in order to enable it to be fetched into the local cache of the new processor performing the migrated task is slow and power inefficient. Thus, flushing the local cache of a processor to be powered down back to the main memory in its entirety and then requiring the data concerned to be refetched from the main memory will disadvantageously consume power and reduce the advantages associated with powering down one of the processors.

Another approach that avoids flushing the entire local cache memory contents to main memory is to leave the local cache memory powered up so that the local cache memory concerned can continue to satisfy snoop requests for the data it is holding and the data does not need to be flushed to the main memory and refetched. A disadvantage with this approach is that a local cache memory which remains powered while its processor is powered down consumes a disadvantageous amount of power thus reducing the benefit that is achieved by powering down the associated processor.

SUMMARY OF THE INVENTION

Viewed from one aspect the present invention provides apparatus for processing data comprising:

a plurality of processors responsive to respective streams of program instructions to execute respective processing tasks;

a plurality of local cache memories each coupled to a respective one of said plurality of processors;

a cache coherency controller coupled to said plurality of local cache memories for maintaining coherency between data stored within said plurality of local cache memories;

a processor power controller coupled to at least one of said plurality of processors and responsive to a power down request for a processor to switch said processor to a processor low power state; and a cache power controller coupled to at least a local cache memory corresponding to said processor and responsive to said power down request for said processor to maintain power to said local cache memory such that said cache coherency controller continues to have access to data stored within said local cache memory until a predetermined condition is met triggering switching of said local cache memory to a cache low power state in which said data is no longer accessible from said local cache memory.

The present technique recognises that a local cache memory containing data corresponding to a migrated processing task will typically hold useful data for a finite period of time before the data it is holding becomes out-of-date or no longer needed. The technique exploits this recognition by providing a cache power controller which detects when a predetermined condition is met and switches the local cache memory of a powered down processor from a state in which it is able to continue to respond to the cache coherency controller and service snoop requests into a low power state in which the data concerned is no longer accessible. Thus, the local cache memory continues to be powered while it remains useful to do so and then, when the predetermined condition is met corresponding to the usefulness of the data held within the local cache memory being reduced, the local cache memory is placed into a low power state so as to avoid wasting power. Not every processor need have a local cache memory. When the data is no longer accessible, this may mean it is lost or merely that it is no longer readable in the cache low power state, but is retained and would be readable if the cache was powered up.

It will be appreciated that the switching of the processor into the low power state could be performed for a variety of reasons and may or may not correspond to the migration of the processing task to a different processor. The present technique is useful in such circumstances even when a processing task is not being migrated as the local cache memory may nevertheless hold data which would be useful to another of the processors which continuing operation. However, the technique does have particular usefulness when a processing task is migrated.

When a local cache memory is switched to the cache lower power state then it may be flushed of any remaining dirty data in order to preserve data integrity and coherence.

The cache coherency controller will typically perform snoop operations in which a cache request to a local cache memory triggers a snoop request in one or more other local cache memories with the possible result of a snoop hit indicating that the cache request should be met from data from one of the other cache memories. In this context, the predetermined condition which is used to determine when the local cache memory is to be placed into the cache lower powered state may comprise one or a combination of a rate of snoop hits for the local cache memory falling below a threshold value, a ratio of snoop hits to snoop requests for the local cache memory falling below a threshold value and a snoop hit count for a period corresponding to a predetermined number of snoop requests falling below a threshold number.

Other forms of predetermined condition may also be used, such as, for example, a threshold number of snoop requests to the local cache memory have occurred since the processor associated with that local cache memory switched to its processor low power state, a number of clock cycles since the processor switched to its processor low power state has exceeded a threshold number or that a processing task which was migrated from the processor which entered the processor lower powered state has been completed by another processor.

Another possibility is that the predetermined condition corresponds to a number of dirty cache lines within the local cache memory of the powered down processor falling below a threshold number of dirty cache lines.

The flushing of the local cache memory before it enters into the cache low power state can be controlled in a variety of different ways. In some embodiments the cache power controller may control the flushing of the local cache memory. In order embodiments the processor which was placed into the processor low power state may be switched back into operation to control flushing of the local cache memory before the processor and its associated local cache memory are then both placed into their low power states. Another possibility is that a processor different from the processor placed into the processor low power state is used to flush the local cache memory prior to placing that local cache memory into its low power state.

The technique can be used in a variety of different multi-processor arrangements. In some arrangements the plurality of processors may comprise a symmetric multiprocessor array with one or more processing tasks being migrated to different processors to permit at least some of the processors to be switched to a low power state. In other embodiments the plurality of processors may comprise at least a high performance processor with a high power consumption and a low performance processor with a low power consumption with a processing task being migrated between the high performance processor and the low performance processor in either direction when circumstances permit or as appropriate. It will be appreciated that the high and low designations of these processors in terms of performance and power consumption are relative to each other rather than being indicative of any absolute values.

The low power states for the processors and the local cache memories can have a variety of different states and need not correspond necessarily to being unpowered. However, the present technique may achieve a greater degree of power saving if the cache low power state and the processor low power state are unpowered states.

Viewed from another aspect the present invention provides an apparatus for processing data comprising:

a plurality of processor means for executing respective processing tasks in response to respective streams of program instructions;

a plurality of local cache memory means each coupled to a respective one of said plurality of processor means;

cache coherency control means coupled to said plurality of local cache memories for maintaining coherency between data stored within said plurality of local cache memories;

processor power control means coupled to at least one of said plurality of processor means for switching a processor means to a processor low power state in response to a power down request for said processor means; and cache power control means coupled to at least a local cache memory means corresponding to said processor means for maintain power to said local cache memory means in response to said power down request for said processor means such that said cache coherency control means continues to have access to data stored within said local cache memory means until a predetermined condition is met triggering switching of said local cache memory to a cache low power state in which said data is no longer accessible from said local cache memory.

Viewed from a further aspect the present invention provides a method of processing data comprising the steps of:

executing respective processing tasks with a plurality of processors responsive to respective streams of program instructions;

storing data within a plurality of local cache memories each coupled to a respective one of said plurality of processors;

maintaining coherency between data stored within said plurality of local cache memories using a cache coherency controller coupled to said plurality of local cache memories;

in response to a power down request for a processor, switching said processor to a processor low power state; and in response to said power down request for said processor, maintaining power to said local cache memory such that said cache coherency controller continues to have access to data stored within said local cache memory until a predetermined condition is met triggering switching of said local cache memory to a cache low power state in which said data is no longer accessible from said local cache memory.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
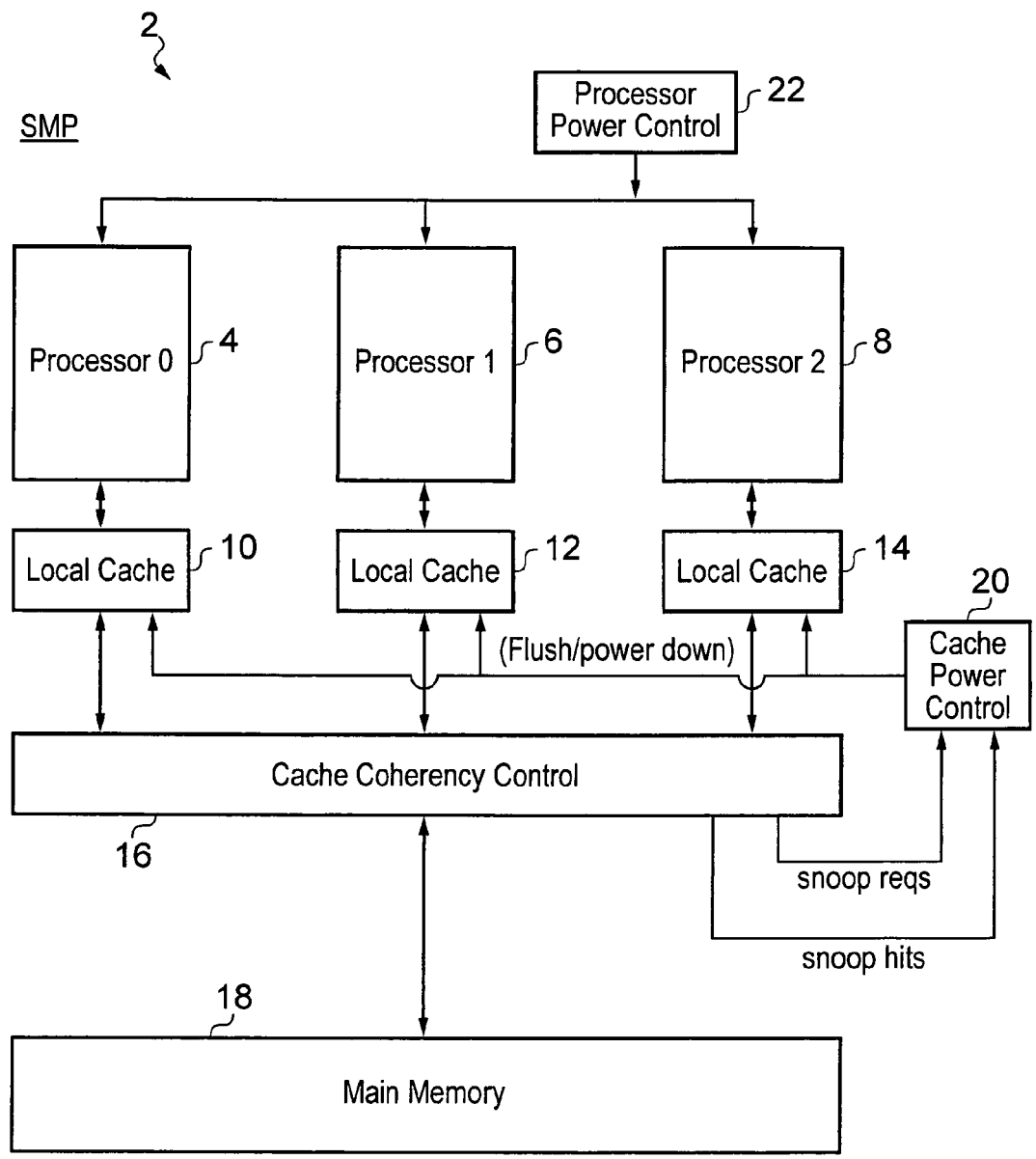
FIG. 1 schematically illustrates a symmetric multiprocessor system.

FIG. 1 schematically illustrates a symmetric multiprocessor system 2 comprising three processors 4, 6, 8 each having an associated local cache memory 10, 12, 14. A cache coherency controller 16 is coupled to each of the local cache memories 10, 12, 14 and is responsible for maintaining coherence between the data held within the local cache memories 10, 12, 14 with respect to each other and with respect to corresponding data within a main memory 18. The cache coherency controller 16 issues snoop requests and detects snoop hits in respect of the other local cache memories 10, 12, 14 when a cache request is made within one of the local cache memories 10, 12, 14. This snooping and cache coherency control operation in itself can have a variety of different forms as will be familiar to those in this technical field.

In addition to the normal behaviour of the cache coherency controller 16 in interacting with the local cache memories 10, 12, 14, it also provides signals indicative of snoop requests issued and snoop hits occurring to a cache power controller 20. These snoop requests and snoop hits signalled to the cache power controller 20 also identify as to the local cache memory to which they correspond. As an example, if the processor 4 issues a cache request to the local cache 10, then the cache coherency controller 16 will issue snoop requests to the local cache 12 and the local cache 14 to determine whether or not either of these holds a more up-to-date value for the item being requested from the local cache 10 before any value held within the local cache 10 is passed back to the processor 4, or a value is fetched from the main memory 18 to be passed back to the processor 4. If, for example, the local cache memory 14 includes this data item, then a snoop hit will occur in respect of the local cache memory 14 and this will be signalled to the cache power controller 20. The snoop hit will also be used by the cache coherency controller 16 to route the data item(s) stored within the local cache memory 14 to the local cache memory 10 in order to service the cache request which was received by the local cache 10. The cache power controller 20 receives snoop request signals indicating which local cache memories 10, 12, 14 have been subject to snoop requests and snoop hit signals indicating which local cache memories 10, 12, 14 have responded by indicating a snoop hit.

Also illustrated in FIG. 1 is a processor power controller 22 coupled to each of the processors 4, 6, 8. This processor power controller 22 is used to place one or more of the processors 4, 6, 8 into a low power state (e.g. unpowered) when circumstances permit in order to reduce the overall power consumption of the symmetric multiprocessor system 2. The processor power controller 22 may be hardware that detects for itself when it is possible to power down one or more of the processors 4, 6, 8 or alternatively it may be driven by software executing on one or more of the processors 4, 6, 8, such as operating system software. Operating system software will often be well placed to determine whether and when it is appropriate to power down one or more of the processors 4, 6, 8 as the operating system is typically responsible for scheduling tasks and will have access to information indicative of likely processing loads. The operating system software is also able to migrate processing tasks between processors as will be familiar to those in the technical field.

Figure 2:
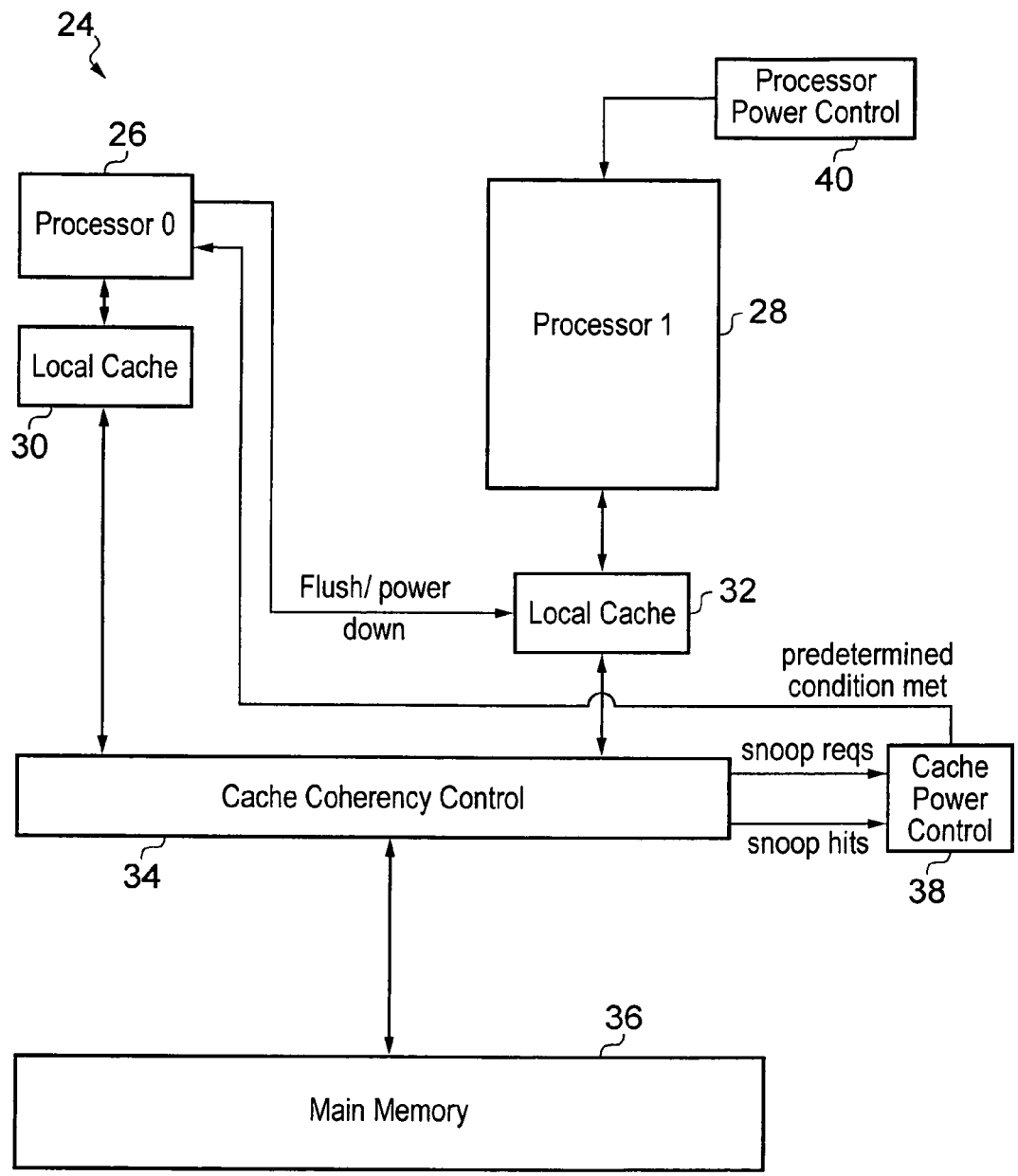
FIG. 2 schematically illustrates a multiprocessor system having processors with different performance levels and power consumption levels.

FIG. 2 illustrates a multiprocessor system 24 including a low performance processor 26 which is small and low power as well as a high performance processor 28 which is large and high power. No absolute level of performance or power consumption is required as this will depend upon the particular application and circumstance. However, such asymmetric multiprocessor systems are typically provided so that the low performance processor 26 is used when low power consumption rather than high performance is the priority and the high performance processor 28 is used when high performance rather than low power consumption is the priority. It is also possible to use both processors 26, 28 together for even higher performance. Processing tasks may be migrated between the processors depending upon changing requirements under operating system control.

Local cache memories 30, 32 are associated with the processors 26, 28. A cache coherency controller 34 is coupled to both of the local cache memories 30, 32 as well as a main memory 36. The cache coherency controller 34 issues snoop requests and responds to snoop hits as previously described in order to ensure coherence between the data stored within the local cache memories 30, 32 as well with the main memory 36. A cache power controller 38 is coupled to the cache coherency controllers 34 and signals the low performance processor 26 when a predetermined condition has been met indicating that it is appropriate to power down the local cache 32 associated with the higher performance processor 28 subsequent to the high performance processor 28 itself having been powered down. The low performance processor 26 will first trigger a flush of any remaining dirty data from the local cache memory 32 back to the main memory 36 before the local cache memory 32 is placed into the cache low power state. The cache low powered state may be an unpowered state or a data retention state in which the data held is no longer accessible, but the values are maintained until the local cache memory 32 is returned to its normal powered state.

A processor power controller 40 is coupled to the higher performance processor 28 and can switch the high performance processor 28 into a processor low power state, such as an unpowered state.

It will be appreciated from the example embodiment of FIG. 2 that in this case it is only the high performance processor 28 and the associated local cache memory 32 which are selectively placed into their respective low power states as processing demand makes appropriate. The low performance processor 26 and the associated local cache memory 30 remain powered throughout as in this example embodiment these elements will always be active and serve to provide a residual level of supported processing performance. It will-be appreciated that it will also be possible for the low performance processor 26 and the local cache memory 30 to be powered down in a different embodiment if that was deemed appropriate.

Figure 3:
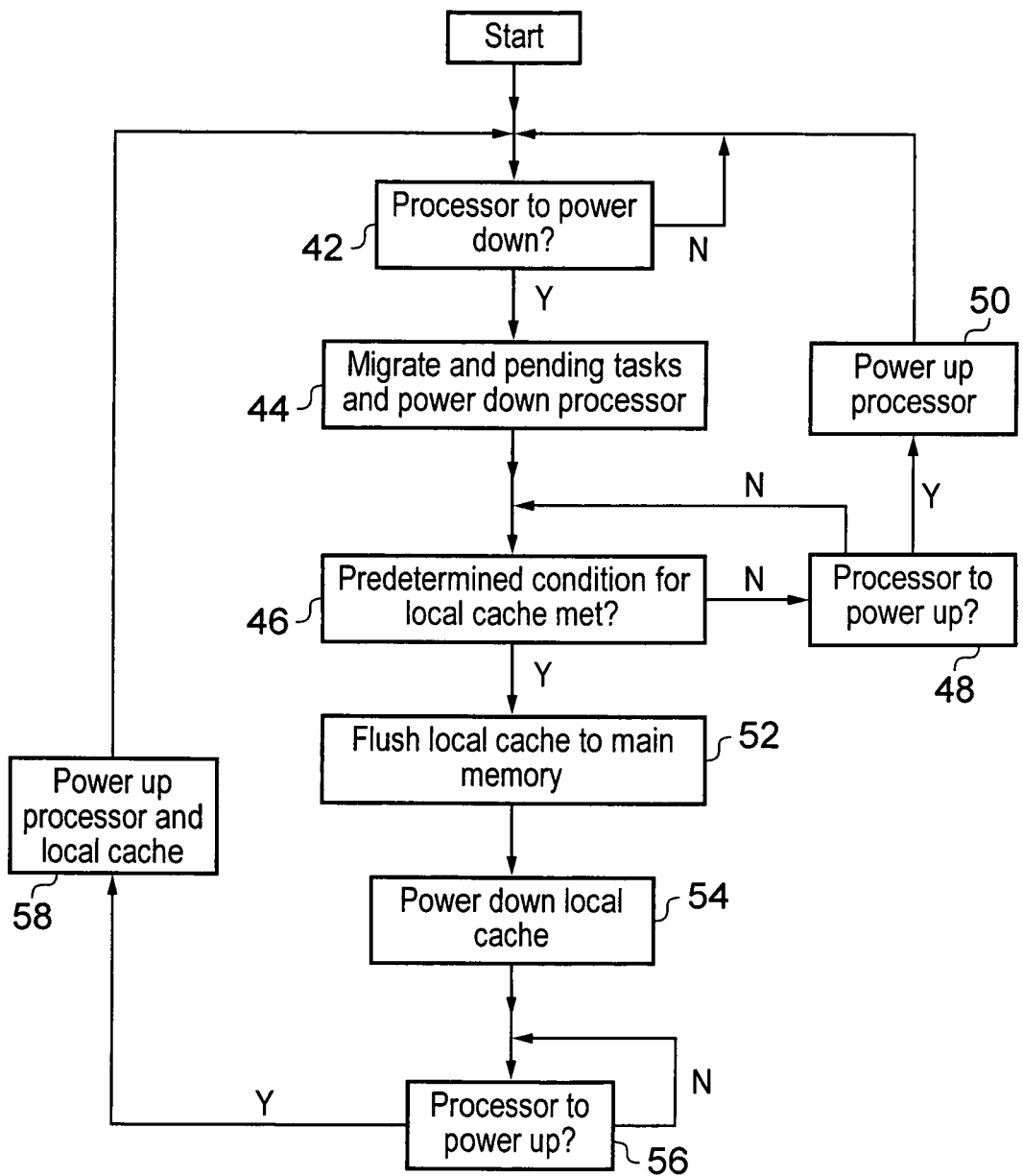
FIG. 3 is a flow diagram schematically illustrating the control of powering down and powering up a processor and its corresponding local cache memory.

FIG. 3 is a flow diagram schematically illustrating the processing performed by the various elements within the systems of FIGS. 1 and 2 when powering down a processor and its associated local cache memory. These processing steps may be performed between the cache power controllers 20, 38, the processor power controllers 22, 40 and one or more of the processors 4, 6, 8, 26, 28 as appropriate in the particular implementation. It is also possible that various tasks illustrated in FIG. 3 may be performed in a different order or in parallel by different entities.

At step 42 processing waits until the processor being controlled is required to power down. This power down request may come from hardware monitoring the activity of the system 2, 24, or via operating system monitoring or a combination of both. When the processor is to power down, step 44 migrates any pending tasks executing on that processor to one of the other processors 4, 6, 8, 26 within the system. In the example of FIG. 1, if the processor 8 was being powered down, then its pending processing tasks would be migrated to either of the processors 4 or 6. In the case of the embodiment of FIG. 2, a processing task executing on the high performance processor 28 would be migrated to the low performance processor 26 as this is the processor which remains active.

Subsequent to the migration of the pending task or tasks and the powering down of the processor at step 44, step 46 starts to determine whether or not the predetermined condition corresponding to the point at which the associated local cache memory may be powered down has yet been met. This predetermined condition can take many different forms as will be described later. If the predetermined condition has not been met, then step 48 determines whether or not there is any requirement to power up the processor which was powered down at step 44. If there is no such requirement to power up the processor, then processing returns to step 46. If the processor is to be powered up as determined at step 48, then step 50 will serve to perform-this-processor-power-up. In this case it will be appreciated that the processor will have been powered down at step 44 and powered up at step 50 without the local cache memory associated therewith having been powered down.

If the determination at step 46 is that the predetermined condition for powering down the local cache memory has been met, then step 52 serves to flush the local cache memory to the main memory (or a lower level of cache). This flushing of the local cache memory may be performed under control of the cache power controller 20, 38 or under control of one of the processors 4, 6, 8, 26. If one of the processors is controlling the flushing, then this may be a different processor to the processor which was powered down at step 44. Alternatively, the processor powered down at step 44 could be temporarily powered back up to control the flushing of its own associated local cache memory. All of these different possibilities are encompassed within the present techniques.

Subsequent to the flushing of the local cache memory to the main memory at step 52, step 54 powers down the local cache memory into the cache low power state. This cache low power state may correspond to the local cache memory being unpowered or placed into a data retention state in which the data values it holds are not lost but are no longer readable and may not be snooped or otherwise used by the cache coherency controller 16, 34.

At step 56 the system waits with the processor powered down and the local cache powered down until there is a determination that the processor is to be powered up. When such a determination is made, then processing proceeds to step 58 where both the processor and its associated local cache memory are powered up.

Figure 4:
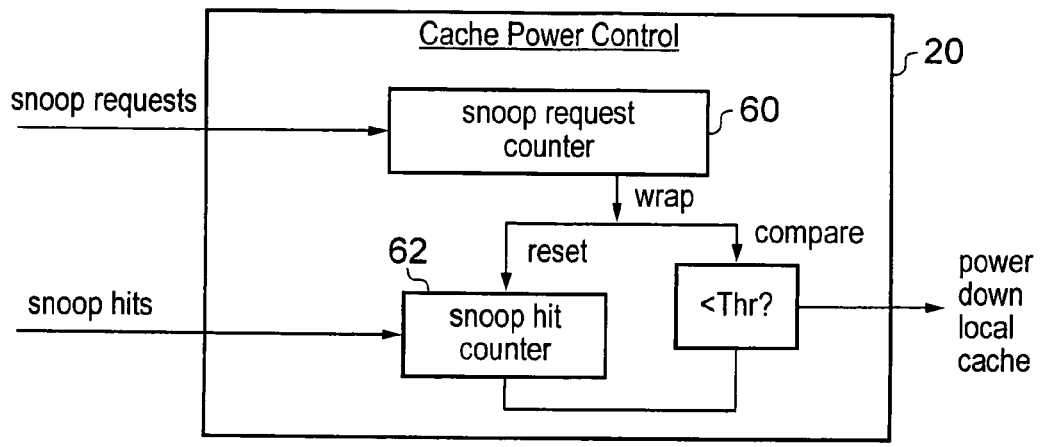
FIGS. 4 to 9 schematically illustrate mechanisms for detecting various forms of predetermined condition used to trigger a local cache memory entering a low power state following the power down of its associated processor.

FIG. 4 illustrates one example of how the cache power controller 20 may detect whether the predetermined condition has been met. In this example, the cache power controller 20 includes a snoop request counter 60 which counts snoop requests to the local cache memory with an associated processor which has been powered down. A snoop hit counter 62 counts snoop hits within that same local cache memory. Each time the snoop request counter wraps around its maximum count value, this serves to trigger a comparison of the current snoop hit counter value with a threshold value. If the snoop hit counter value is below the threshold value, then a power down local cache signal is generated which triggers the powering down of the local cache memory. The snoop hit counter value being below the threshold value in this way indicates that the data being held within the local cache memory is no longer of sufficient relevance to the ongoing operation of the system to justify the continued operation of the local cache memory and placing the local cache memory into its low power state will save overall power consumption without unduly affecting system performance. The wrap signal from the snoop request counter 60 also serves to reset the snoop hit counter 62. Thus, if the snoop request counter counts up to N snoop requests before wrapping, then the snoop hit counter 62 will determine the number of snoop hits per N snoop requests and when this falls beneath the threshold value the power down local cache signal will be generated.

Figure 5:
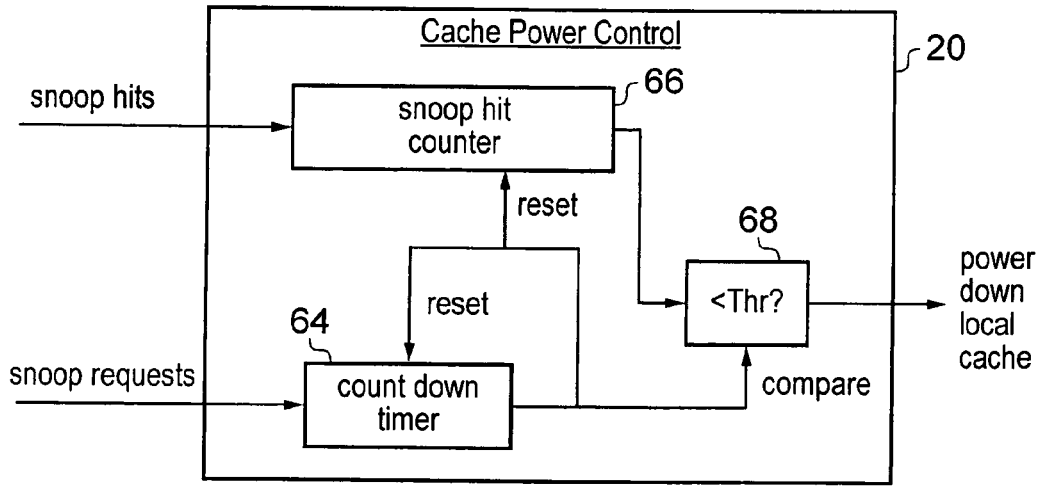

FIG. 5 illustrates another example of how the cache power controller 20 may determine whether or not the predetermined condition has been met. In this example embodiment a count down counter 64 counts down snoop requests from a predetermined start value to zero and a snoop hit counter 66 counts values following the powering down of the associated processor 4, 6, 8, 26, 28. When the count down counter 64 reaches zero it outputs a pulse to a comparator 68 which determines whether the snoop hit count held in the snoop hit counter 66 is above or below a predetermined threshold number at that time. If the snoop hit count is below the threshold number, then the predetermined condition is met and the signal to power down the local cache (and clean) is generated. The pulse from the count down timer 64 also resets the count down time 64 to its predetermined start value and the snoop hit counter 66 to zero. Thus, if the threshold was not exceeded, then the process can be repeated.

Figure 6:
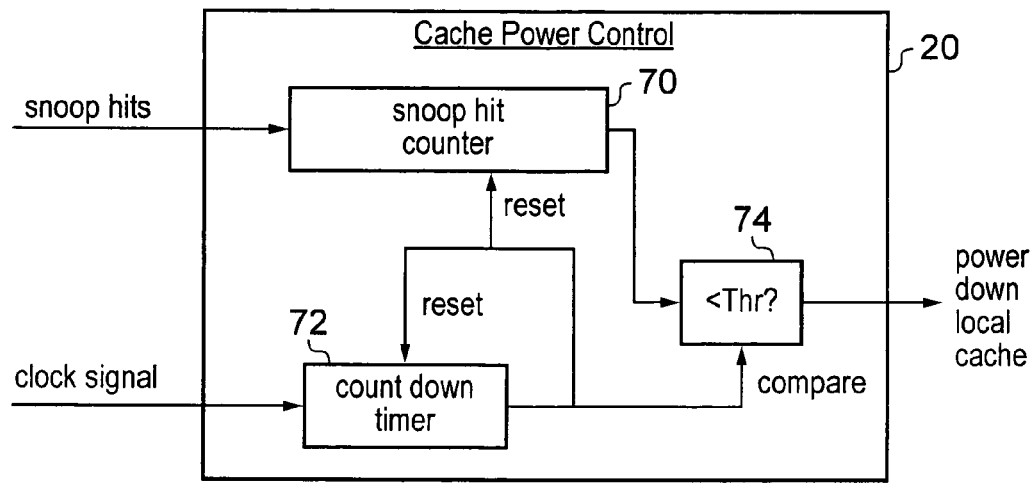

FIG. 6 illustrates a further example of how the cache power controller may determine whether or not the predetermined condition has been met. In this case the predetermined condition is that the rate of snoop hits relative to the number of clock cycles since the processor powered down falls below a threshold value. Thus, in this case the cache power controller 20 includes a snoop hit counter 70 and a count down counter 72 responsive to the clock signal. As in FIG. 5, when the count down of clock signals by the count down counter 72 reaches zero starting from its predetermined start value, a comparator 74 determines if the snoop hit count at that time is below a threshold value. If the snoop bit count is below the threshold value, then this indicates the predetermined condition is met and the signal to power down the local cache is generated. The count down timer 72 reaching zero also triggers resetting of the snoop hit counter 70 to zero and the count down counter 72 to its start value so monitoring can continue if the predetermined condition has not yet been met.

Figure 7:
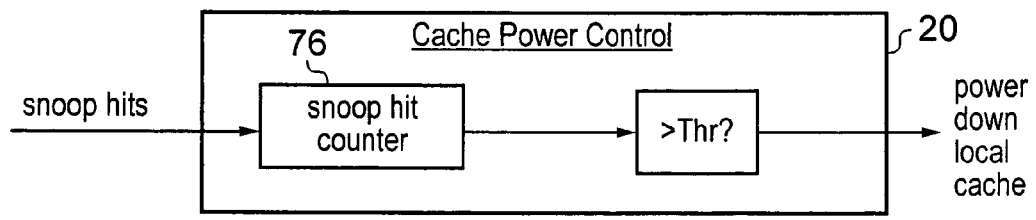

FIG. 7 illustrates another example of how the cache power controller 20 may determine whether or not the predetermined condition has been met. In this example the cache power controller 20 includes a snoop hit counter 76 which counts snoop hits subsequent to the processor 4, 6, 8, 26, 28 associated with the local cache memory concerned being powered down and when this snoop hit count exceeds a threshold value then the powered down local cache signal is generated.

Figure 8:
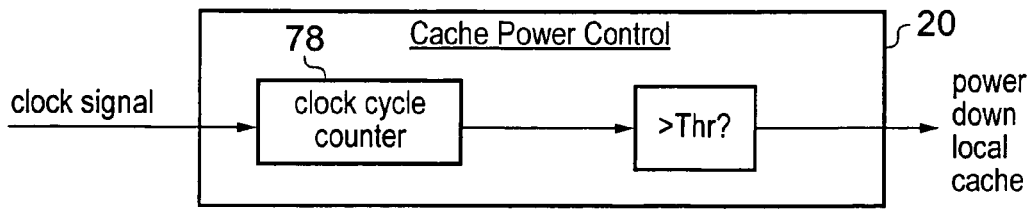

FIG. 8 illustrates a further example which is similar to that of FIG. 7. In this example the cache power controller 20 includes a clock cycle counter 78 and the power down local cache signal is generated after a predetermined number of clock cycles have passed since the power down of the processor concerned.

Figure 9:
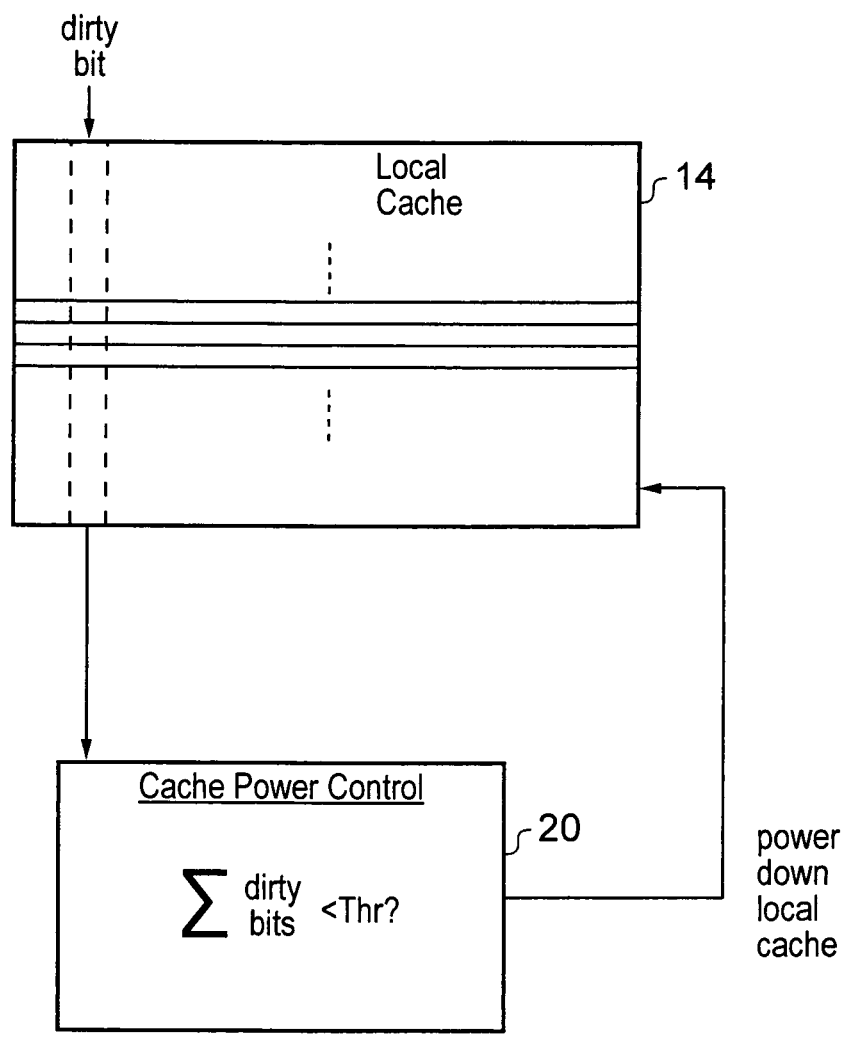

FIG. 9 illustrates a further example embodiment. In this embodiment dirty bits associated with data values held within a local cache memory 14 are monitored by the cache power controller 20. When the number of dirty bits associated with data values held within the local cache memory 14 falls below a threshold value, the power down local cache signal is generated. As data values are read from the local cache 14 and used elsewhere within the processor system 2, 24, then the dirty bits within the local cache memory 14 of those data values are cleared as the most up-to-date versions of those data values will be held elsewhere in the system. Thus, the total number of dirty bits within the local cache memory 14 should steadily reduce and when this has fallen below a threshold value this indicates that the data held within the local cache memory 14 is no longer of sufficient utility to justify the power being consumed by not placing the local cache memory 14 into its cache low power state.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of processing data comprising the steps of:
   executing respective processing tasks with a plurality of processors responsive to respective streams of program instructions;
   storing data within a plurality of local cache memories, each of said memories coupled to a respective one of said plurality of processors;
   maintaining coherency between data stored within said plurality of local cache memories using a cache coherency controller coupled to said plurality of local cache memories;
   switching, in response to a power down request for at least one of said plurality of processors, said at least one processor to a processor low power state; and
   maintaining, in response to said power down request for said at least one processor, power to at least one of said local cache memories such that said cache coherency controller continues to have access to data stored within said at least one local cache memory until a predetermined condition is met, wherein meeting of said predetermined condition triggers switching of said at least one local cache memory to a cache low power state in which said data is no longer accessible from said at least one local cache memory, wherein, after said predetermined condition is met, said local cache memory is flushed of any remaining dirty data before being switched to said cache low power state.

2. An apparatus for processing data comprising:
   a plurality of processors responsive to respective streams of program instructions to execute respective processing tasks;
   a plurality of local cache memories each coupled to a respective one of said plurality of processors;
   a cache coherency controller, coupled to said plurality of local cache memories, configured to maintain coherency between data stored within said plurality of local cache memories;
   a processor power controller, coupled to at least one of said plurality of processors and responsive to a power down request for at least one of said plurality of processors, configured to switch said at least one processor to a processor low power state; and
   a cache power controller, coupled to at least one of said plurality of local cache memories corresponding to said at least one processor and responsive to said power down request for said at least one processor to maintain power to said at least one local cache memory after said at least one processor has switched to said processor low power state, said cache coherency controller configured to have access to data stored within said at least one local cache memory until a predetermined condition is met, wherein meeting of said predetermined condition triggers switching of said at least one local cache memory to a cache low power state in which said data is no longer accessible from said at least one local cache memory, wherein, after said predetermined condition is met, said local cache memory is flushed of any remaining dirty data before being switched to said cache low power state.

3. An apparatus as claimed in claim 2, wherein said processor is switched to said processor low power state following migration of a processing task to a different processor with data for said processing task continuing to be accessible to said cache coherency controller from said local cache memory until said predetermined condition is met.

4. An apparatus as claimed in claim 3, wherein said predetermined condition is a signal indicating that said processing task has completed.

5. An apparatus as claimed in claim 2, wherein said cache coherency controller performs snoop operations in which a cache request to one local cache memory triggers a snoop request in one or more other local cache memories to detect a snoop hit indicating that said cache request should be met with data from one of said other cache memories.

6. An apparatus as claimed in claim 5, wherein said predetermined condition comprises a rate of snoop hits for said local cache memory falling below a threshold value.

7. An apparatus as claimed in claim 5, wherein said predetermined condition comprises a ratio of snoop hits to snoop requests for said local cache memory falling below a threshold value.

8. An apparatus as claimed in claim 5, wherein cache power controller comprises a snoop request counter for counting snoop requests and reset every N snoop requests and a snoop hit counter for counting snoop hits occurring between resets of said snoop request counter, said predetermined condition comprising detection of said snoop hit counter indicating fewer than a threshold number of snoop hits when said snoop request counter is reset.

9. An apparatus as claimed in claim 8, wherein said snoop request counter is a count down counter starting from a start value of N and reset to said start value of N upon reaching zero.

10. An apparatus as claimed in claim 5, wherein said predetermined condition is that a threshold number of snoop requests to said local cache memory have occurred since said processor switched to said processor low power state.

11. An apparatus as claimed in claim 2, wherein at least part of said apparatus is clocked by a clock signal and said predetermined condition is that a threshold number of cycles of said clock signal have passed since said processor switched to said processor low power state.

12. An apparatus as claimed in claim 2, wherein said predetermined condition comprises a number of dirty cache lines within said local cache memory falling below a threshold value.

13. An apparatus as claimed in claim 2, wherein said cache power controller controls said flushing of said local cache memory.

14. An apparatus as claimed in claim 2, wherein said processor is switched out of said processor low power state to control said flushing of said local cache memory prior to power down of said local cache memory and said processor.

15. An apparatus as claimed in claim 2, wherein a processor different from said processor in said processor low power state controls said flushing of said local cache memory.

16. An apparatus as claimed in claim 2, wherein said plurality of processor comprise a symmetric multiprocessor array with one or more processing tasks being migrated to different processors to permit at least some of said processors to be switched to a low power state.

17. An apparatus as claimed in claim 2, wherein said plurality of processor comprises at least a high performance processor with a high power consumption and a low performance processor with a low power consumption and said processing task is migrated from said high performance processor to said low performance processor.

18. An apparatus as claimed in claim 2, wherein said plurality of processor comprises at least a high performance processor with a high power consumption and a low performance processor with a low power consumption and said processing task is migrated from said low performance processor to said high performance processor.

19. An apparatus as claimed in claim 2, wherein said processor low power state is unpowered.

20. An apparatus as claimed in claim 2, wherein said cache low power state is unpowered.

21. An apparatus for processing data comprising:
a plurality of processor means for executing respective processing tasks in response to respective streams of program instructions;
a plurality of local cache memory means for storing said data, each of said local cache memory means coupled to a respective one of said plurality of processor means;
cache coherency control means, coupled to said plurality of local cache memory means, for maintaining coherency between data stored within said plurality of local cache memory means;
processor power control means, coupled to at least one of said plurality of processor means, for switching said at least one processor means to a processor low power state in response to a power down request for said at least one of said processor means; and
cache power control means, coupled to at least one of said local cache memory means corresponding to said at least one processor means for maintaining power to said at least one of said local cache memory means in response to said power down request for said at least one processor means after said at least one processor means has switched to said processor low power state, for maintaining access to data stored within said at least one local cache memory means until a predetermined condition is met and for triggering switching of said at least one local cache memory means to a cache low power state in which said data is no longer accessible from said at least one local cache memory means, wherein, after said predetermined condition is met, said local cache memory means is flushed of any remaining dirty data before being switched to said cache low power state.

* * * * *